(12) United States Patent
Moegling et al.

(10) Patent No.: US 8,556,350 B2
(45) Date of Patent: Oct. 15, 2013

(54) TETHER BRACKET ASSEMBLY AND SEAT ASSEMBLY HAVING THE SAME

(75) Inventors: Peter James Moegling, Brighton, MI (US); Todd Rupert Muck, Fowlerville, MI (US); Robert Joseph Hazlewood, Plymouth, MI (US); Masroor Fahim, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 375 days.

(21) Appl. No.: 13/018,472

(22) Filed: Feb. 1, 2011

(65) Prior Publication Data

US 2012/0193967 A1 Aug. 2, 2012

(51) Int. Cl.
*A47C 7/02* (2006.01)
*B60N 2/42* (2006.01)
*A47D 1/10* (2006.01)

(52) U.S. Cl.
USPC ............. 297/452.18; 297/464; 297/254

(58) Field of Classification Search
USPC ............ 297/485, 452.18, 216.1, 463.1, 254, 297/464; 296/68.1, 65.03, 1.04
See application file for complete search history.

(56) References Cited

U.S. PATENT DOCUMENTS

| | | | |
|---|---|---|---|
| 6,095,604 A | 8/2000 | Stack et al. | |
| 6,267,442 B1 | 7/2001 | Shiino et al. | |
| 7,296,854 B2 * | 11/2007 | Lentz | 297/353 |
| 7,328,947 B2 | 2/2008 | Laporte et al. | |
| 7,407,215 B2 | 8/2008 | Chalhoub | |
| 7,699,396 B2 | 4/2010 | Ghisoni et al. | |
| 2003/0184138 A1 | 10/2003 | Haverkamp | |
| 2004/0080194 A1 * | 4/2004 | Medvecky et al. | 297/253 |

* cited by examiner

*Primary Examiner* — Milton Nelson, Jr.
(74) *Attorney, Agent, or Firm* — Gifford, Krass, Sprinkle, Anderson & Citkowski, P.C.

(57) ABSTRACT

A tether bracket assembly for securing a connector of a child seat is used in conjunction with a seat assembly having an U-shaped seat back frame. The U-shaped seat back frame includes a top horizontal cylindrical bar. The tether bracket assembly includes a mounting bracket having a concave surface which includes a curvature complementary to the cylindrical bar of the seat back frame, the concave surface being affixed to an underside of the cylindrical bar. The tether bracket assembly further includes an elongated tether bracket having a first end and an opposite second end. The first end is operatively attached to the mounting bracket. The second end is adapted to engage with a connector of a child seat to secure the child seat to the seat assembly. The elongated tether bracket projects generally upward beyond the top horizontal cylindrical bar of the seat back frame.

15 Claims, 4 Drawing Sheets

TETHER BRACKET ASSEMBLY AND SEAT ASSEMBLY HAVING THE SAME

FIELD OF THE INVENTION

The present invention relates to a tether bracket assembly for use in securing a connector of a child safety seat and, more particularly, to a tether bracket assembly attached to a seat back which is independent of a rear wall of a vehicle.

BACKGROUND OF THE INVENTION

Most modern automotive vehicles include tether bracket assemblies for securing child seats to the vehicle. It is known in the prior art to secure the tether bracket assembly to the rear wall of the automotive vehicle, for example in a truck. For example, U.S. Pat. No. 7,407,215 issued Aug. 5, 2008, (which is herein incorporated by references) discloses a tether bracket assembly which is directly bolted to the rear wall of the truck. The attachment of the tether bracket assembly to the rear wall provides the required stability for the child safety seat.

However, modern automotive vehicles, typically trucks, include openable rear windows. The rear windows are either electronically or manually lowered such that the rear window is positioned within the rear wall of the truck in the open position. The placement of the rear window within the rear wall decreases the rigidity of the rear wall as the rear wall is now required to house a window. The decrease in the rigidity inhibits the ability to secure the tether bracket assembly to the rear wall due to the reduction in structural integrity of the rear wall.

Further, the direct attachment of a tether bracket assembly to a seat assembly often results in undesirable connections. For example, the attachment of the tether bracket assembly to the seat back positions the connection, such as a weld, in a manner that upon the application of a load the integrity of the weld is compromised. Specifically, the tether is positioned such that upon loading, the tether bracket assembly is pulled away from the seat back thereby increasing the failure rate of the weld.

Thus, there exists a need for an improved tether bracket assembly, independent of the rear wall of the vehicle, attaches to a seat back and is independent of a rear wall of a vehicle, and which during the application of a load maintains the integrity of the connection.

SUMMARY OF THE INVENTION

The present invention provides an improved tether bracket assembly which overcomes the above-mentioned disadvantages of the previously known tether bracket assemblies which connect to a rear wall of an automotive vehicle or which increase the failure rate of the connection.

In brief, a tether bracket assembly for securing a connector of a child seat is provided. The tether bracket assembly is used in conjunction with a seat assembly having a U-shaped seat back frame. The U-shaped seat back frame includes a top horizontal cylindrical bar. The tether bracket assembly includes a mounting bracket having a concave surface which includes a curvature complementary to the cylindrical bar of the seat back frame, the concave surface being affixed to an underside of the cylindrical bar. The tether bracket assembly further includes an elongated tether bracket having a first end and an opposite second end. The first end is operatively attached to the mounting bracket. The second end is adapted to engage with a connector of a child seat to secure the child seat to the seat assembly. The elongated tether bracket projects generally upward beyond the top horizontal cylindrical bar of the seat back frame.

In one embodiment, the mounting bracket includes a pair of spaced apart side walls extending generally normal to the longitudinal direction of the top horizontal cylindrical bar. The spaced apart pair of side walls provide the mounting bracket with a generally U shape. The concave surface of the mounting bracket is formed on the spaced apart pair of side walls.

BRIEF DESCRIPTION OF THE DRAWINGS

Advantages of the present invention will be readily appreciated as the same becomes understood by reference to the following detailed description when considered in conjunction with the accompanying drawings wherein like reference characters refer to like parts throughout the several views and in which.

DETAILED DESCRIPTION OF THE INVENTION

The present invention has utility as a tether bracket assembly for securing a child seat to a seat assembly which overcomes the above-mentioned disadvantages. The inventive tether bracket assembly attaches to the seat back and is independent of the rear wall of the automotive vehicle. The independency of the tether bracket assembly from the rear wall provides additional design freedom for the seat assembly. Further, connecting the tether bracket, specifically the mounting bracket, to the underside of the top horizontal cylindrical bar allows for the mounting bracket to be forced towards the cylindrical bar during the application of load thereby maintaining the integrity of the connection between the mounting bracket and the cylindrical bar.

Figure 1:
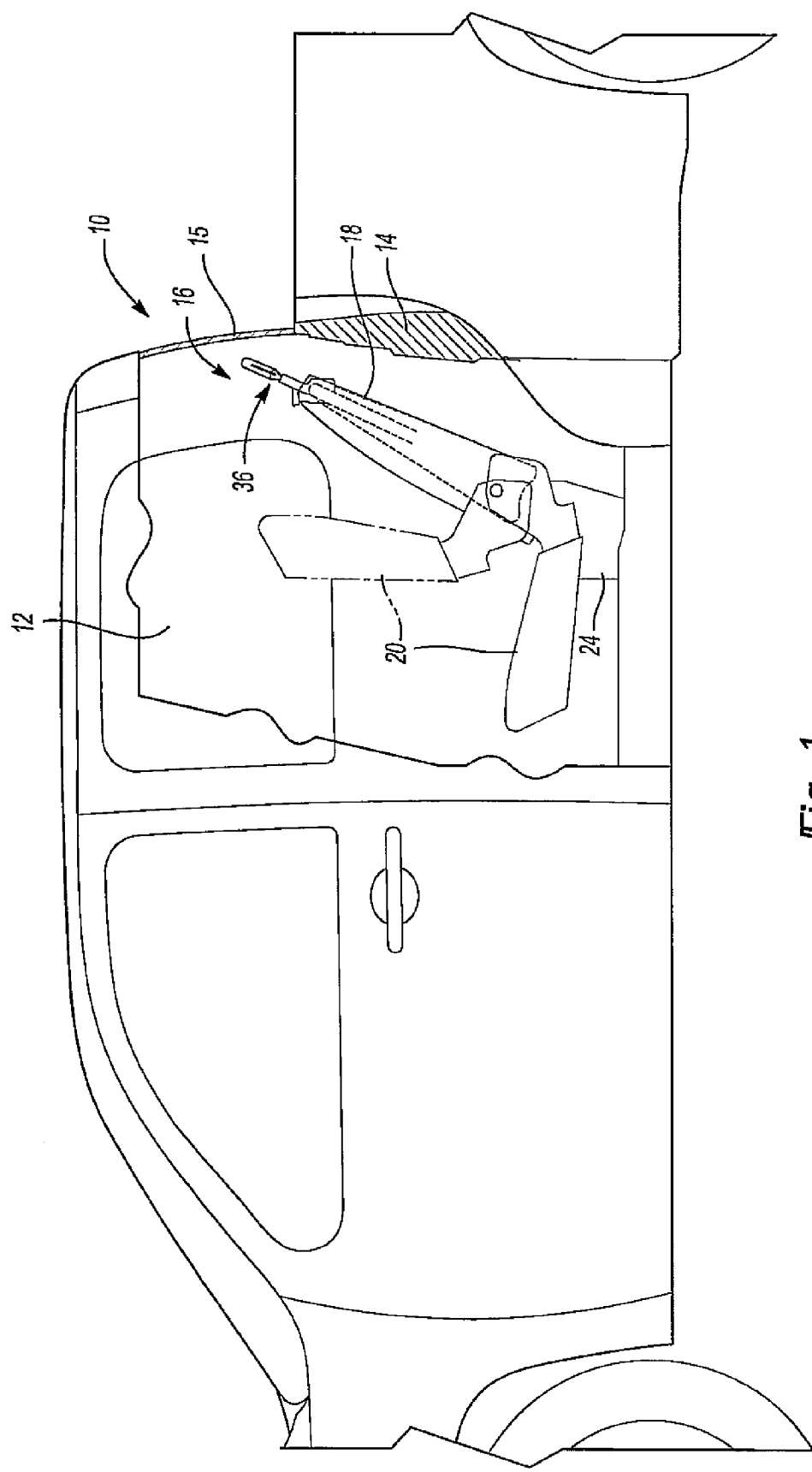
FIG. 1 illustrates an automotive vehicle having the inventive tether bracket assembly.

With reference to FIG. 1, an automotive vehicle, specifically a truck, is illustrated at 10. The automotive vehicle includes a passenger compartment 12 defined in part by a rear wall 14 having a rear window 15. A seat assembly 16 is positioned within the passenger compartment 12.

The seat assembly 16 includes a seat back 18, a seat cushion 20 pivotally connected to the seat back 18, and a floor bracket 24 which mounts the seat back 18 and the seat cushion 20 to the vehicle 10. As seen in FIG. 1, the seat back 18 connects to the vehicle through the floor bracket 24 and is independent of the rear wall 14. It is appreciated, of course, that although the seat back 18 is described as being affixed to the floor bracket 24, the seat back 18 optionally includes a recliner mechanism allowing the seat back 18 to be selectively positioned between a reclined position, a seated position, and optionally a folded position.

Figure 2:
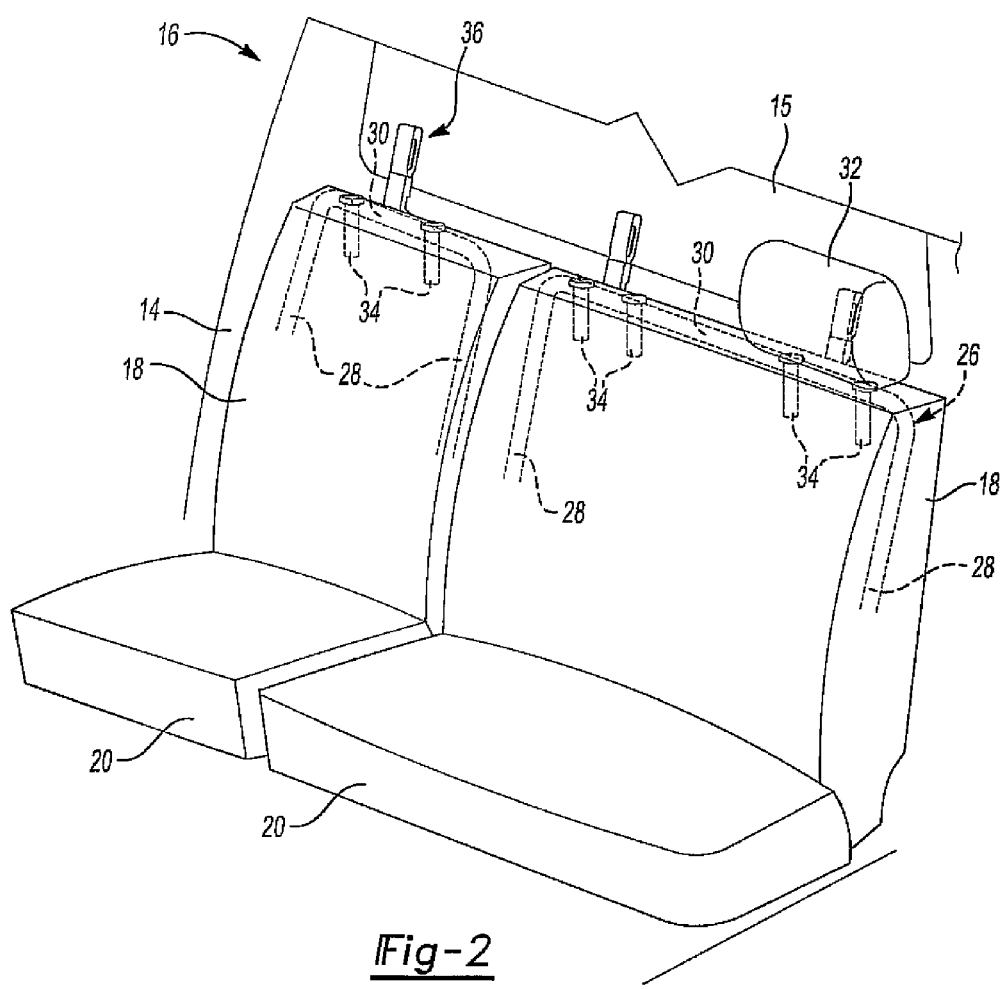
FIG. 2 is a partial perspective view of a seat assembly having the tether bracket assembly attached to the seat back.

Referring to FIG. 2, the seat back 18 includes a seat back frame 26 having a generally inverted U shape. The seat back frame 26 includes a pair of generally upright side members 28 and a generally horizontal top member 30 traversing the pair of side members 28. Headrests 32 are attached to the seat assembly 16 by pairs of headrest guides 34 affixed to the top member 30. Positioned between each pair of headrest guides is a tether bracket assembly 36. The tether bracket assemblies 36 are used for securing a child seat (not shown) to the seat assembly 16.

Figure 3:
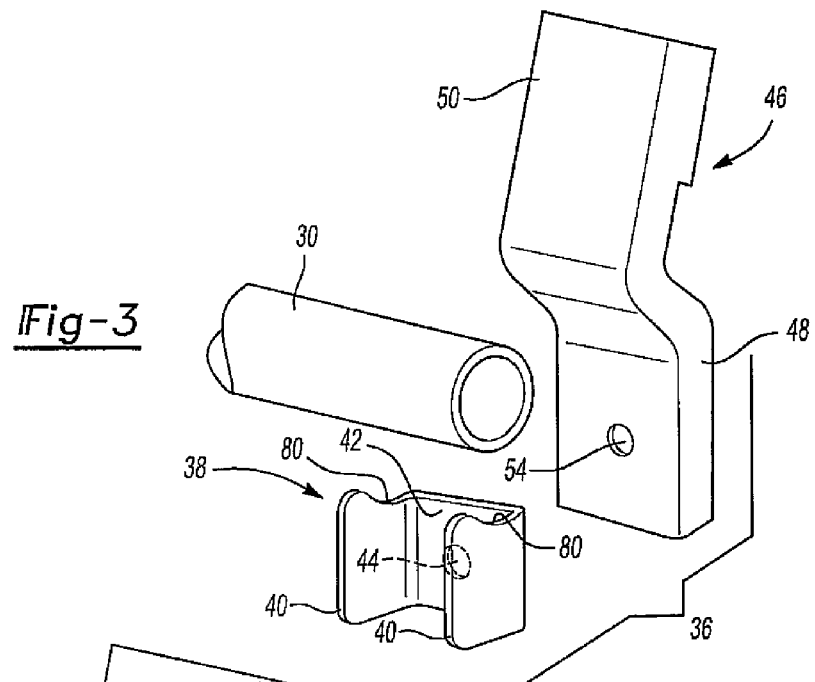
FIG. 3 is a partial exploded view of the tether bracket assembly.
Figure 4:
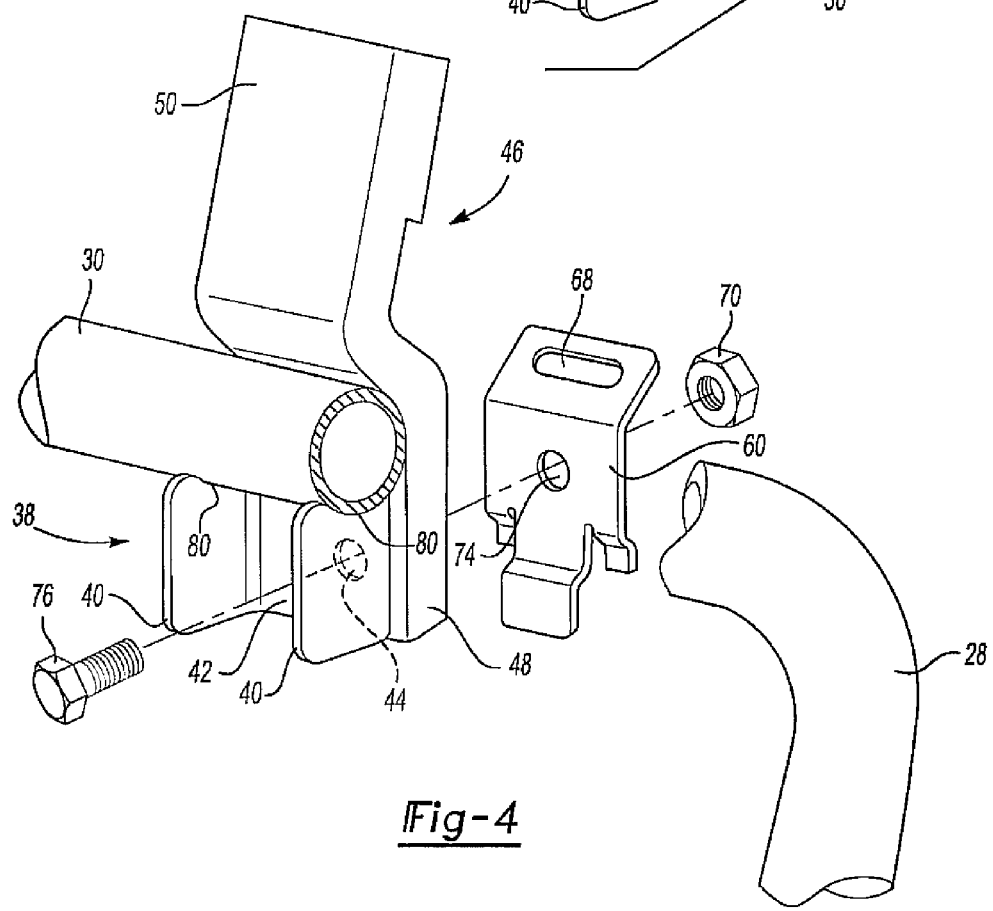
FIG. 4 is a partial exploded view of the tether bracket assembly connected to the seat back.
Figure 5:
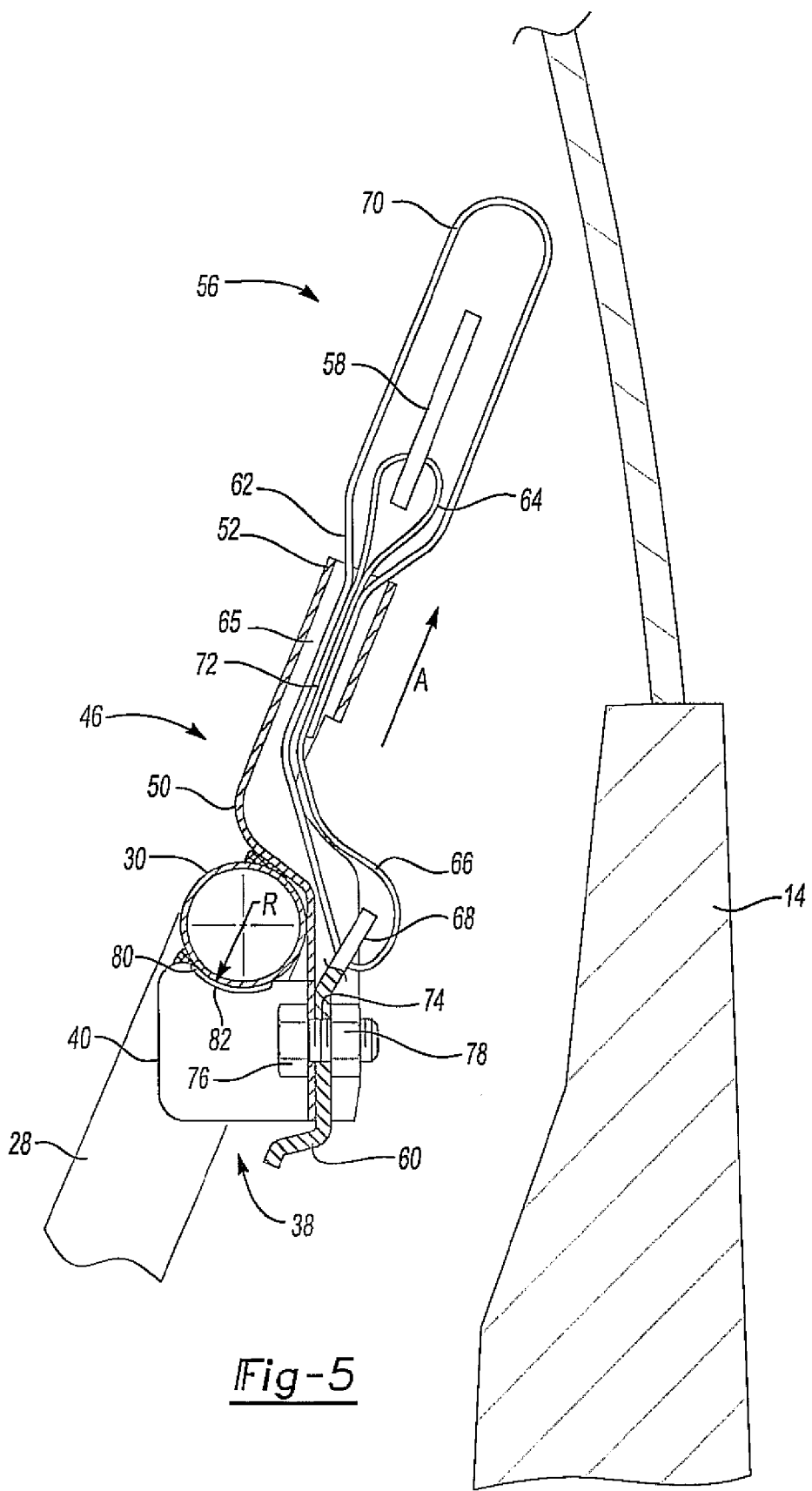
FIG. 5 is a partial cross-sectional view illustrating the connection of the tether bracket assembly to the seat back.

With reference to FIGS. 3-5, the tether bracket assembly 36 will now be described in greater detail. The tether bracket assembly 36 includes a mounting bracket 38 having a pair of spaced apart side walls 40 and a generally planar section 42 traversing the pair of spaced apart side walls 40. An aperture 44 is positioned on the generally planar section 42 in between the spaced apart pair of side walls 40.

The tether bracket assembly 36 further includes an elongated tether bracket 46 having a lower portion 48, a middle portion 50, and an upper portion 52. The lower portion 48 of the elongated tether bracket 46 includes a generally U-shaped open cross section having an aperture 54. The upper portion 52 includes a channel 65 and is adapted to engage with the connector of a child safety seat through the use of a tether 56. The elongated tether bracket 46 has a generally S-shaped profile such that the top member 30 is positioned between middle portion 50 and the mounting bracket 38, specifically the pair of spaced apart side walls 40 as best seen in FIG. 5.

The tether 56 includes a receiver 58 and a connector 60. The tether 56 further includes a strap 62 which connects the receiver 58 to the connector 60. The strap 62 includes a first loop 64 which extends through an opening formed on the lower portion of the receiver 58 and a second loop 66 which extends through an opening 68 formed in an upper portion of the connector 60. The strap 62 includes a third loop 70 which surrounds both the receiver 58 and the first loop 64. As best seen in the cross-sectional view of FIG. 5, the strap 62 is formed from a single length of material, which is folded in an overlapping manner and sewed along a middle section 72 to form the first loop 64, the second loop 66, and the third loop 70. The middle section of the strap 62 is positioned within the channel 65 of the elongated tether bracket 46.

The connector 60 includes an aperture 74 which corresponds to the aperture 54 formed on the lower portion 48 of the tether bracket 46 and the aperture 44 formed on the mounting bracket 38. A fastener 76 extends through the apertures 44, 54, and 74 to secure both the mounting bracket 38 and the connector 60 to the tether bracket 36 with nut 78. As best seen in FIG. 5, the connector 60 is positioned within the generally U-shaped open cross section of the lower portion 48.

It is appreciated, of course, that the mounting bracket 38, specifically the planar section 42, is formed as a portion of the lower portion 48 of the tether bracket 46 such that the tether bracket 46 and the mounting bracket 38 are fanned as an integrally monolithic one-piece structure as best seen in FIG. 5. In the alternative, the mounting bracket 38 and the tether bracket 46 are formed as two separate pieces which are then secured through use of the fastener 76 and nut 78 positioned on an outer surface of the connector 60.

In order to connect the tether bracket 46 to the seat back frame 26, the mounting bracket 38 (as either a separate structure or integrally formed with the tether bracket 46) includes a complimentary or concave surface 80 which has a curvature complementary to the top member 30. Specifically, the top member 30 has a cylindrical shape having predetermined circular profile (i.e. a generally circular cross section) having an outer radius R. The concave surface 80 includes a radius of curvature equal to the outer radius R of the top member 30. The concave surface 80 is formed on an upper portion of each of the spaced apart side walls 40. The mounting bracket 38, specifically the concave surface 80, is then welded along weld line 82 to an underside of the top member 30. As such, the tether bracket assembly 36 is connected to the top member 30 of the seat back frame 26 without connection to the rear wall 14.

It is appreciated, of course, that the top member 30 has various other predetermined profiles illustratively including rectangular, triangular, octagonal or any other regular or irregular configuration. The mounting bracket 38 will be configured such that the complimentary surface 80 has a shape complimentary to the predetermined profile of the top member 30.

Accordingly, the tether bracket 46 is positioned to extend generally coplanar with the side member 28 of the seat back frame 26 as best seen in FIG. 5. The welding of the concave surface 80 to the underside of the top member 30 is particularly advantageous as the mounting bracket 38 will be forced towards the underside of the top member 30 upon application of a load on the tether bracket assembly 36, in the direction of arrow A, thereby maintaining the integrity of the weld 82. Further, by maintaining the integrity of the weld 82, the structural integrity of the overall tether bracket assembly 36 is improved along with increasing the rigidity of the connection and decreasing the failure rate of the weld 82.

From the foregoing, it can be seen that the present invention provides an inventive tether bracket assembly for securing to a top member of a seat back frame allowing the tether bracket to be independent of a rear wall of a vehicle. Further, the attachment of the mounting bracket of the tether bracket to an underside of the top member through the use of a concave surface having a complementary curvature to the top member maintains the integrity of the weld. Having described the invention, however, many modifications thereto will become apparent to those skilled in the art to which it pertains without deviation from the spirit of the invention as defined by the scope of the appended claims.

It is claimed:

1. A tether bracket assembly for securing a connector of a child safety seat, the tether bracket assembly mounted to a seat assembly having a seat back frame with a top horizontal bar portion having a predetermined profile, said tether bracket assembly comprising:
   an elongated tether bracket having an engaging portion at a first end and a mounting portion at an opposite second end;
   said engaging portion adapted to engage with the connector of the child safety seat, and said engaging portion projects generally upward beyond the top horizontal bar portion;
   said mounting portion having a complimentary surface which has a shape complementary to the predetermined profile of the top horizontal bar portion, said complimentary surface welded to an underside of the top horizontal bar portion.

2. The tether bracket assembly of claim 1, wherein the predetermined profile of the top horizontal bar portion is generally circular and said complimentary surface has a generally concave shape complimentary to the top horizontal bar portion.

3. The tether bracket assembly of claim 1, wherein said mounting portion is a mounting bracket operatively attached to said second end of said elongated tether bracket.

4. The tether bracket assembly of claim 1, wherein said mounting portion includes a pair of spaced apart side walls, and wherein said complimentary surface is formed on said pair of spaced apart side walls.

5. The tether bracket assembly of claim 1, wherein the seat back frame includes a pair of headrest guides attached to the top horizontal bar portion, and wherein said complimentary surface is affixed to the top horizontal bar portion between the pair of headrest guides.

6. The tether bracket assembly of claim 1, wherein upon an application of a load on said engaging portion said complimentary surface is forced against the top horizontal bar portion.

7. A seat assembly for securing a connector of a child safety seat, the seat assembly used with an automotive vehicle having a rear wall, said seat assembly comprising:
a seat back frame having a top horizontal bar portion having a predetermined profile; and
an elongated tether bracket having an engaging portion at a first end and a mounting portion at an opposite second end, said engaging portion adapted to engage with the connector of the child safety seat, and said engaging portion projects generally upward beyond said top horizontal bar portion, said mounting portion having a complimentary surface which has a shape complementary to said predetermined profile of said top horizontal bar portion, said complimentary surface being affixed to an underside of said top horizontal bar portion;
wherein said seat back frame includes a pair of headrest guides attached to said top horizontal bar portion, and wherein said complimentary surface of said mounting portion is affixed to said top horizontal bar portion between said pair of headrest guides.

8. The seat assembly of claim 7, wherein, said seat back frame being independent of the rear wall of the vehicle.

9. The seat assembly of claim 7, wherein said mounting portion includes a pair of spaced apart side walls, and wherein said complimentary surface is formed on said pair of spaced apart side walls.

10. The seat assembly of claim 9, wherein said mounting portion is a mounting bracket operatively attached to said second end of said tether bracket.

11. The seat assembly of claim 7, wherein said top horizontal bar portion is generally cylindrical, and wherein said complimentary surface of said mounting portion has a concave surface having a curvature complementary to said top horizontal bar portion.

12. The seat assembly of claim 11, wherein said concave surface is welded to the underside of said top horizontal bar portion.

13. The seat assembly of claim 12, wherein upon an application of a load on said engaging portion of said tether bracket said complimentary surface is forced against said underside of said top horizontal bar portion.

14. A tether bracket assembly for securing a connector of a child safety seat, the tether bracket assembly mounted to a seat assembly having a U-shaped frame including a top horizontal cylindrical bar portion, a pair of headrest guides being attached to the top horizontal cylindrical bar portion, said tether bracket assembly comprising:
a mounting bracket having a pair of spaced apart side walls, said pair of side walls defining a concave surface having a curvature complementary to an underside of the top horizontal cylindrical bar portion, said concave surface being welded to the underside of the top horizontal cylindrical bar portion between the pair of headrest guides; and
an elongated tether bracket having a first end and an opposite second end, said second end operatively attached to said mounting bracket, said first end adapted to engage with the connector of the child safety seat, said elongated tether bracket projecting generally upward beyond the top horizontal cylindrical bar portion;
wherein upon an application of a load on the tether bracket said concave surface is forced against the underside of the top horizontal cylindrical bar portion.

15. The tether bracket assembly of claim 14, wherein said mounting bracket includes a base having a first surface and an opposite second surface, said pair of side walls extending generally normal from said first surface of said base, and wherein said second end of said tether bracket is operatively attached to said base such that said second surface of said base contacts said second end.

* * * * *